(12) United States Patent
Robert et al.

(10) Patent No.: US 10,671,696 B2
(45) Date of Patent: Jun. 2, 2020

(54) ENHANCING HYBRID QUANTUM-CLASSICAL ALGORITHMS FOR OPTIMIZATION

(71) Applicant: International Business Machines Corporation, Armonk, NY (US)

(72) Inventors: Anton Robert, Igny (FR); Panagiotis Barkoutsos, Zurich (CH); Giacomo Nannicini, New York, NY (US); Ivano Tavernelli, Zurich (CH); Stefan Woerner, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 16/151,444

(22) Filed: Oct. 4, 2018

(65) Prior Publication Data

US 2020/0110789 A1    Apr. 9, 2020

(51) Int. Cl.
  *G06F 17/11*    (2006.01)
  *G06F 7/08*    (2006.01)
  *G06N 10/00*    (2019.01)

(52) U.S. Cl.
  CPC ............. *G06F 17/11* (2013.01); *G06F 7/08* (2013.01); *G06N 10/00* (2019.01)

(58) Field of Classification Search
  CPC ............ G06F 17/11; G06F 7/08; G06N 10/00
  USPC ........................................................ 708/232
  See application file for complete search history.

(56) References Cited

U.S. PATENT DOCUMENTS

| 7,398,162 B2 | 7/2008 | Downs |
| 9,026,574 B2 | 5/2015 | Macready |
| 9,471,880 B2 | 10/2016 | Williams |

(Continued)

FOREIGN PATENT DOCUMENTS

WO    20171119371 W    6/2017

OTHER PUBLICATIONS

Gough et al., "Hamilton-Jacobi-Bellman equations for Quantum Optimal Feedback Control", 2005.
(Continued)

*Primary Examiner* — Tan V Mai
(74) *Attorney, Agent, or Firm* — Garg Law Firm, PLLC; Rakesh Garg; Keivan Razavi

(57) ABSTRACT

A method for enhancing hybrid-classical algorithms for combinatorial optimization includes executing, on a quantum processor, a variational algorithm, the execution producing a subset of a set of solutions (solution space) of the variational algorithm within a predefined period, the variational algorithm computing a quantum state of a quantum system corresponding to a combinatorial optimization problem, each solution in the subset having a corresponding value; sorting, according to a sorting criterion, the subset of solutions; isolating, based on the sorting, a portion of the subset of solutions wherein a value corresponding to each solution in the portion is within a boundary defined by a threshold value; computing an average value of the solutions from the portion of the subset of solutions; and altering the variational algorithm to produce a second subset of solutions such that the second subset of solutions comprises solutions having values within the boundary.

20 Claims, 5 Drawing Sheets

(56) References Cited

U.S. PATENT DOCUMENTS

| | | | |
|---|---|---|---|
| 2014/0187427 A1* | 7/2014 | Macready | G06N 7/005 |
| | | | 505/170 |
| 2017/0083841 A1 | 3/2017 | Syrichas | |
| 2018/0091440 A1 | 3/2018 | Dadashikelayeh | |
| 2019/0266213 A1* | 8/2019 | Hastings | G06F 17/17 |

OTHER PUBLICATIONS

Woerner et al, "Improving Variational Quantum Optimization based on Conditional Value at Risk Objective", Sep. 6, 2018.

* cited by examiner

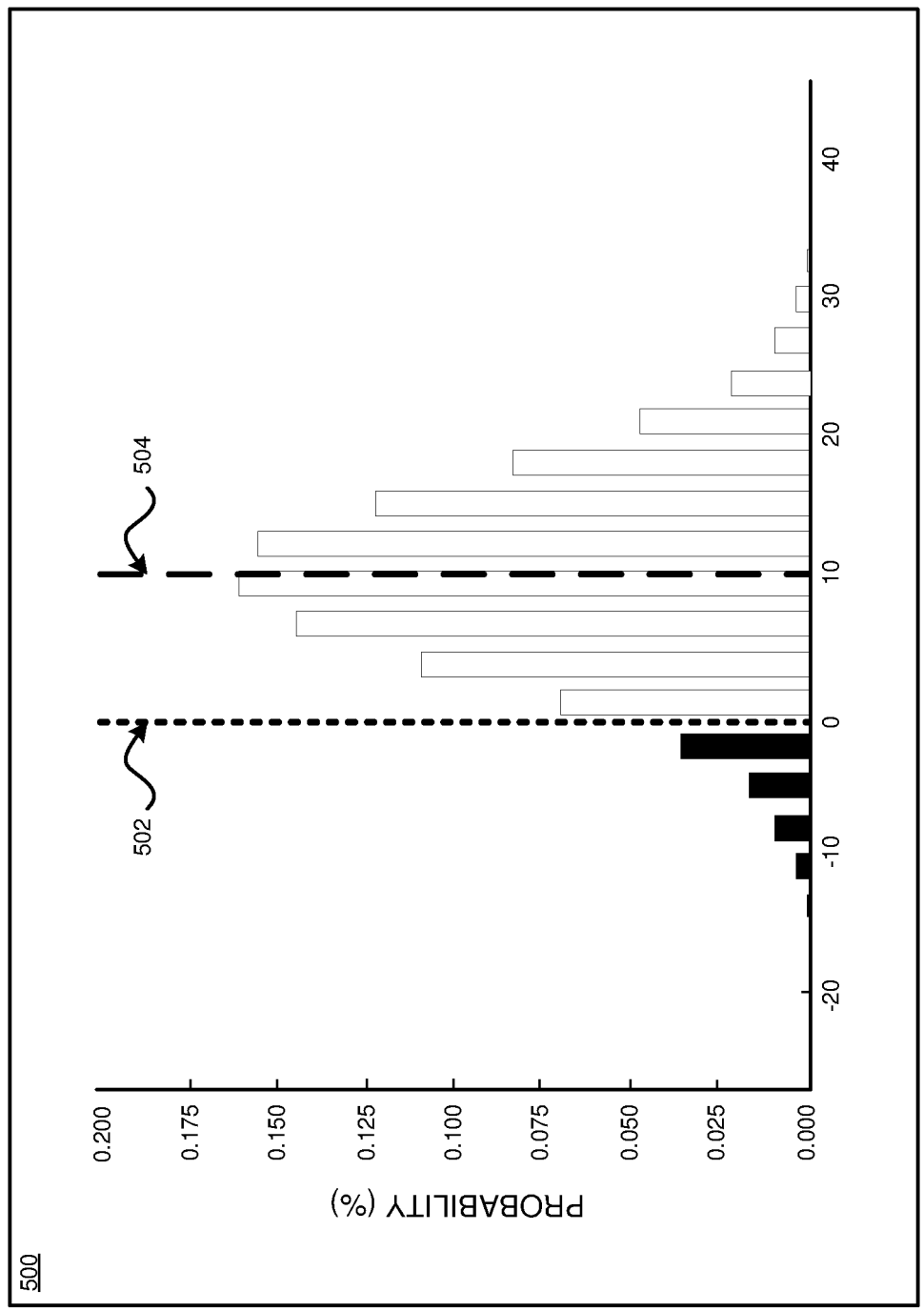

ENHANCING HYBRID QUANTUM-CLASSICAL ALGORITHMS FOR OPTIMIZATION

TECHNICAL FIELD

The present invention relates generally to variational algorithms using quantum computing. More particularly, the present invention relates to a method for enhancing hybrid quantum-classical algorithms for optimization.

BACKGROUND

Hereinafter, a "Q" prefix in a word of phrase is indicative of a reference of that word or phrase in a quantum computing context unless expressly distinguished where used.

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits") to perform computational tasks. In the particular realms where quantum mechanics operates, particles of matter can exist in multiple states-such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 at the same time. Entanglement means that qubits in a superposition can be correlated with each other in a non-classical way; that is, the state of one (whether it is a 1 or a 0 or both) can depend on the state of another, and that there is more information that can be ascertained about the two qubits when they are entangled than when they are treated individually.

Using these two principles, qubits operate as more sophisticated processors of information, enabling quantum computers to function in ways that allow them to solve difficult problems that are intractable using conventional computers. IBM has successfully constructed and demonstrated the operability of a quantum processor using superconducting qubits (IBM is a registered trademark of International Business Machines corporation in the United States and in other countries.)

The illustrative embodiments recognize that quantum processors can perform variational algorithms which presently available conventional processors are either incapable of performing or can only perform with undesirable accuracy or computational resource consumption. Variational algorithms use a trial wavefunction which is varied to determine an upper bound to a ground state energy of a quantum system. A wavefunction is a mathematical description, such as, of a quantum state of a quantum system. A quantum state is represented on a quantum processor as a series of quantum logic gates acting on qubits. Each quantum state of a quantum system includes a corresponding energy value.

The total energy of the ground state of the quantum system corresponds to a minimum possible value of the total energy of the quantum system. A Hamiltonian is an operator that describes the total energy of a quantum state. A Hamiltonian operator acting on a wavefunction determines a value corresponding to the total energy of the quantum state.

In order to compute an upper bound to the ground state energy of a quantum system, variational algorithms perform numerous evaluations beginning with an initial wavefunction. Each evaluation computes a total energy of a quantum state corresponding to the wavefunction being evaluated. Variational algorithms can then alter parameters of the evaluated wavefunction to generate a new wavefunction, such as, altering at least one quantum logic gate of a set of quantum logic gates to perform a rotation on a qubit. Evaluation of the new wavefunction computes a total energy of the new quantum state corresponding to the new wavefunction. The variational algorithm compares the total energy of the previous wavefunction to the total energy of the new wavefunction.

A conventional processor executes an optimization algorithm that varies the parameters of the wavefunction. A quantum processor computes the corresponding total energy of the wavefunction. Based on the comparison between the total energy of the new wavefunction and the previous wavefunction, the optimization algorithm determines how to vary the parameters of the wavefunction in order to minimize the computed total energy of the quantum system.

A variational algorithm can continue performing evaluations until the computed total energy is relatively stable, such as, successive evaluations computing a total energy within a threshold percentage. The stable computed total energy from the final evaluation corresponds to an upper bound of the minimum energy of the ground state of the quantum system. The corresponding wavefunction represents an approximation of the eigenfunction of the quantum system.

The illustrative embodiments recognize that any general combinatorial optimization problem can be solved using variational algorithms. Combinatorial optimization involves determining a minima or maxima of an objective function. For example, the travelling salesman problem involves determining the shortest possible path between n cities that visits each city exactly once. Combinatorial optimization involves determining the solution (paths between the cities) with the least cost. The solution space of a combinatorial optimization problem is the set of possible solutions. A conditional value at risk focuses on a specific subset of the set of solutions. For example, financial risk measurement cases may look at the expected return (gain/loss) in the worst five percent of cases.

The illustrative embodiments recognize that quantum states of particles in a quantum system can be entangled. Entangled quantum states cannot be described independently of the state of other particles in the quantum system. Entangled quantum states require a description of the quantum system as a whole. The illustrative embodiments recognize that each iteration of a variational algorithm determines only a single potential solution for the quantum state of the quantum system.

The illustrative embodiments recognize that the solution space of combinatorial optimization problems is typically too large to exhaustively search using conventional computers. For many combinatorial optimization problems, computing a sufficiently large sample of the entire solution space is cost prohibitive or not currently possible using conventional computing but may be possible using quantum computing architectures.

The illustrative embodiments further recognize that conventional variational algorithms for approximating the true solution of a combinatorial optimization problem focus on an average over the entire set of solutions (solution space) for each iteration of the variational algorithm. The illustrative embodiments recognize that some potential solutions in the subset of the set of solutions can be closer to the true solution of the combinatorial optimization problem. The illustrative embodiments also recognize that taking an average of the potential solutions closest to a minima or maxima solution may help the variational algorithm to determine a closer approximation to the true solution.

Furthermore, because quantum computing resources are scarce and expensive, a need exists to compute the sufficiently large solution space sample, and their maxima and minima, at the least possible quantum computing cost. Therefore, the illustrative embodiments recognize that a need exists for a novel method to execute a variational algorithm on quantum computing platforms in such a way that the quantum computing cost for producing large solution space samples and their maxima and minima are minimized without a loss of accuracy.

SUMMARY

The illustrative embodiments provide a method, system, and computer program product for enhancing hybrid-quantum classical algorithms for combinatorial optimization. An embodiment includes a method for enhancing quantum-classical algorithms for combinatorial optimization including executing, on a quantum processor, a variational algorithm, the execution producing a subset of a set of solutions (solution space) of the variational algorithm within a predefined period, the variational algorithm computing a ground state of a quantum system corresponding to a combinatorial optimization problem, each solution in the subset having a corresponding value. The embodiment further includes sorting, according to a sorting criterion, the subset of solutions.

The embodiment further includes isolating, based on the sorting, a portion of the subset of solutions wherein a value corresponding to each solution in the portion is within a boundary defined by a threshold value. The embodiment further includes computing an average value of the solutions from the portion of the subset of solutions. The embodiment further includes altering the variational algorithm to produce a second subset of solutions such that the second subset of solutions comprises solutions having values within the boundary.

An embodiment sorting the subset of solutions includes arranging the subset of solutions in ascending order according to the sorting criterion. In an embodiment, the portion of the subset of solutions corresponds to the lowest five percent of the subset of solutions.

An embodiment includes executing, on the quantum processor, the altered variational algorithm, the executing producing the second subset of solutions of the altered variational algorithm within a second predefined period, each solution in the second subset having a corresponding value. An embodiment includes receiving, prior to isolating the portion of the subset of solutions, an input variable corresponding to the threshold value.

In an embodiment, the input variable is a percentage value. An embodiment includes receiving, prior to isolating the portion of the subset of solutions, a first input variable corresponding to the threshold value and a second input variable corresponding to a second threshold level. The embodiment further includes executing, on the quantum processor, a set of iterations of the variational algorithm, the execution producing a subset of a set of solutions (solution space) of the variational algorithm for each iteration of the variational algorithm, each iteration of the variational algorithm computing a quantum state of a quantum system corresponding to a combinatorial optimization problem, each solution in each subset having a corresponding value.

An embodiment includes sorting, according to the sorting criterion, a second subset of solutions and a third subset of solutions. An embodiment includes isolating, based on the sorting, a second portion of a second subset of solutions wherein a value corresponding to each solution in the second portion is within the boundary defined by the threshold value.

An embodiment includes computing an average value of the solutions from the portion of the second subset of solutions. An embodiment includes isolating, based on the sorting, a third portion of a third subset of solutions wherein a value corresponding to each solution in the third portion is within a second boundary defined by the second threshold value.

In an embodiment, executing the variational algorithm includes computing an expectation value of the quantum state of the quantum system, wherein the quantum state of the quantum system corresponds to a set of quantum logic gates on the quantum processor. In an embodiment, the average value of the solutions forms one extreme of the solution space.

In an embodiment, the method is embodied in a computer program product comprising one or more computer-readable storage devices and computer-readable program instructions which are stored on the one or more computer-readable tangible storage devices and executed by one or more processors.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts an example graph of an isolation step for enhancing a quantum-classical hybrid variational algorithm in accordance with an illustrative embodiment.

DETAILED DESCRIPTION

Figure 1:
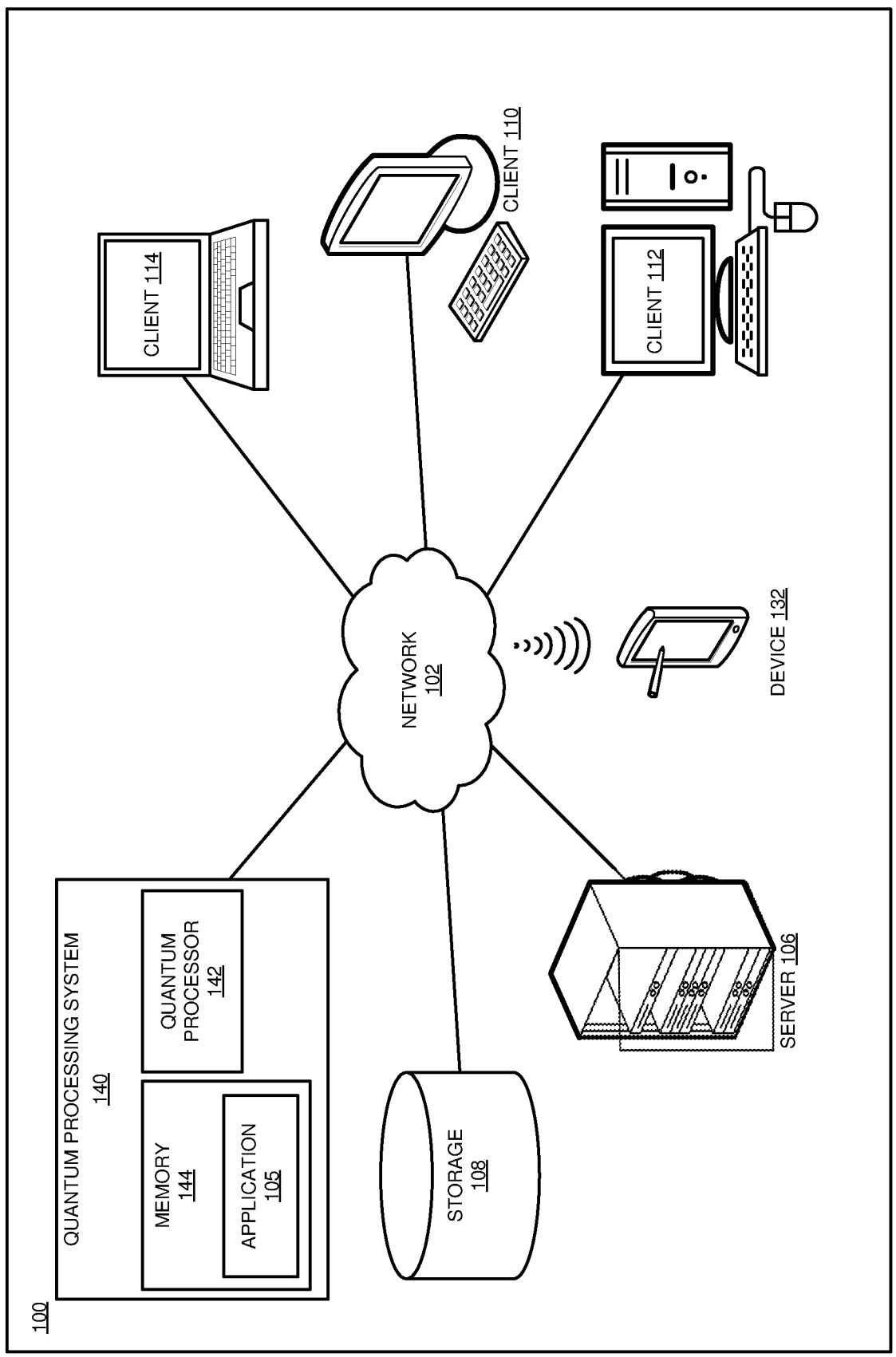
FIG. 1 depicts a block diagram of a network of data processing systems in which illustrative embodiments may be implemented.

The illustrative embodiments used to describe the invention generally address and solve the above-described problem of variational algorithms for quantum computing. The illustrative embodiments provide a method for enhancing quantum-classical algorithms for combinatorial optimization.

An embodiment provides a method for enhancing quantum-classical algorithms for combinatorial optimization. Another embodiment provides a conventional or quantum computer usable program product comprising a computer-readable storage device, and program instructions stored on the storage device, the stored program instructions comprising a method for enhancing quantum-classical algorithms for combinatorial optimization. The instructions are executable using a conventional or quantum processor. Another embodiment provides a computer system comprising a conventional or quantum processor, a computer-readable memory, and a computer-readable storage device, and program instructions stored on the storage device for execution by the processor via the memory, the stored program instructions comprising a method for enhancing quantum-classical algorithms for combinatorial optimization.

The illustrative embodiments recognize that quantum processors can perform variational algorithms to compute an approximation of the ground state energy of a quantum system, for instance, an electron orbital configuration for a molecule with a given interatomic spacing. The Variational Quantum Eigensolver (VQE) is one non-limiting example of a variational algorithm performed with quantum processors. VQE varies parameters to prepare a quantum state and determines the properties of prepared quantum states. A quantum state is prepared on a quantum processor as a series of quantum logic gates acting on qubits.

Variational algorithms iterate to generate new quantum states and to minimize a property corresponding to the quantum states. Variational algorithms include an optimizer to minimize a property corresponding to the quantum states. Each evaluation performed by the variational algorithm includes varying parameters to generate a new quantum state, computing properties of the new quantum state, comparing properties of the new quantum state and a previous quantum state, and determining, based on the comparison, how to vary the parameters in a successive evaluation. For instance, the variational algorithm can perform evaluations to determine an upper bound of the ground state energy of the quantum system.

The variational algorithm varies parameters to generate new quantum states and compares the total energy of the new quantum states to a total energy of previous quantum states. The optimizer of the variational algorithm determines which parameters and/or how to vary the parameters to reduce the computed total energy of the generated quantum states. The variational algorithm continues performing evaluations until the computed total energy reaches a minimum, becoming relatively stable. The computed total energy for the final evaluation corresponds to an upper bound of the ground state energy of the quantum system.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for enhancing quantum-classical algorithms for combinatorial optimization using a variety of components that can be purposed or repurposed to provide a described function within a data processing environment, and such adaptations are contemplated within the scope of the illustrative embodiments.

The illustrative embodiments are described with respect to certain types of steps, applications, quantum logic gates, and data processing environments only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
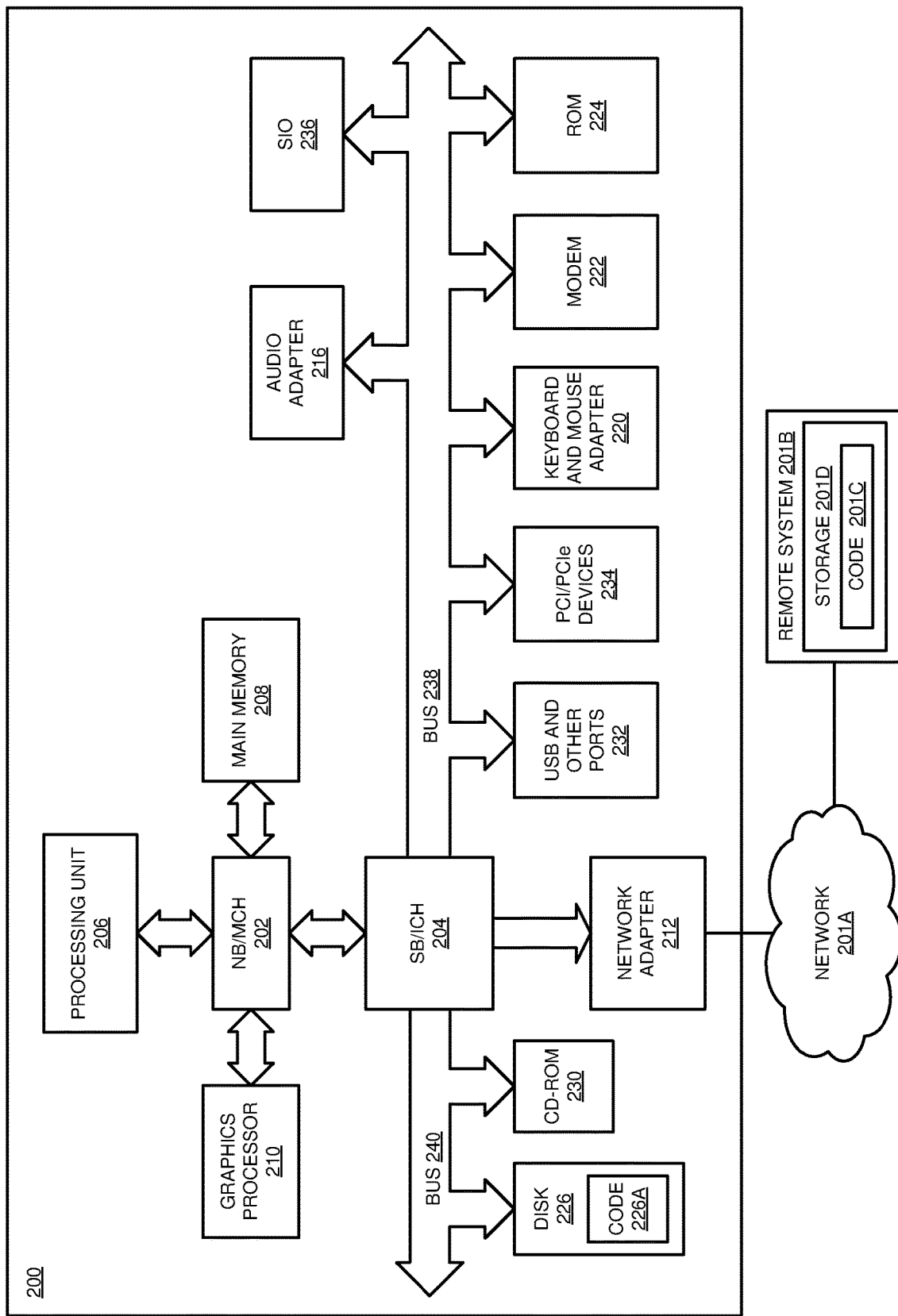
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 106 couples to network 102 along with storage unit 108. Server 106 is a conventional data processing system. Quantum processing system 140 couples to network 102. Quantum processing system 140 is a quantum data processing system. Software applications may execute on any quantum data processing system in data processing environment 100. Any software application described as executing in quantum processing system 140 in FIG. 1 can be configured to execute in another quantum data processing system in a similar manner. Any data or information stored or produced in quantum processing system 140 in FIG. 1 can be configured to be stored or produced in another quantum data processing system in a similar manner. A quantum data processing system, such as quantum processing system 140, may contain data and may have software applications or software tools executing quantum computing processes thereon.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several conventional data processing systems, quantum data processing systems, and a data network as shown, whereas another embodiment can be implemented on a single conventional data processing system or single quantum data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, quantum processing system 140, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 144 may provide data, such as boot files, operating system images, and applications to quantum processor 142. Quantum processor 142 may include its own data, boot files, operating system images, and applications. Data processing environment 100 may include additional memories, quantum processors, and other devices that are not shown. Memory 144 includes application 105 that may be configured to implement one or more of the functions described herein for converging a variational algorithm solution space for quantum computing in accordance with one or more embodiments.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as servers 104 and 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
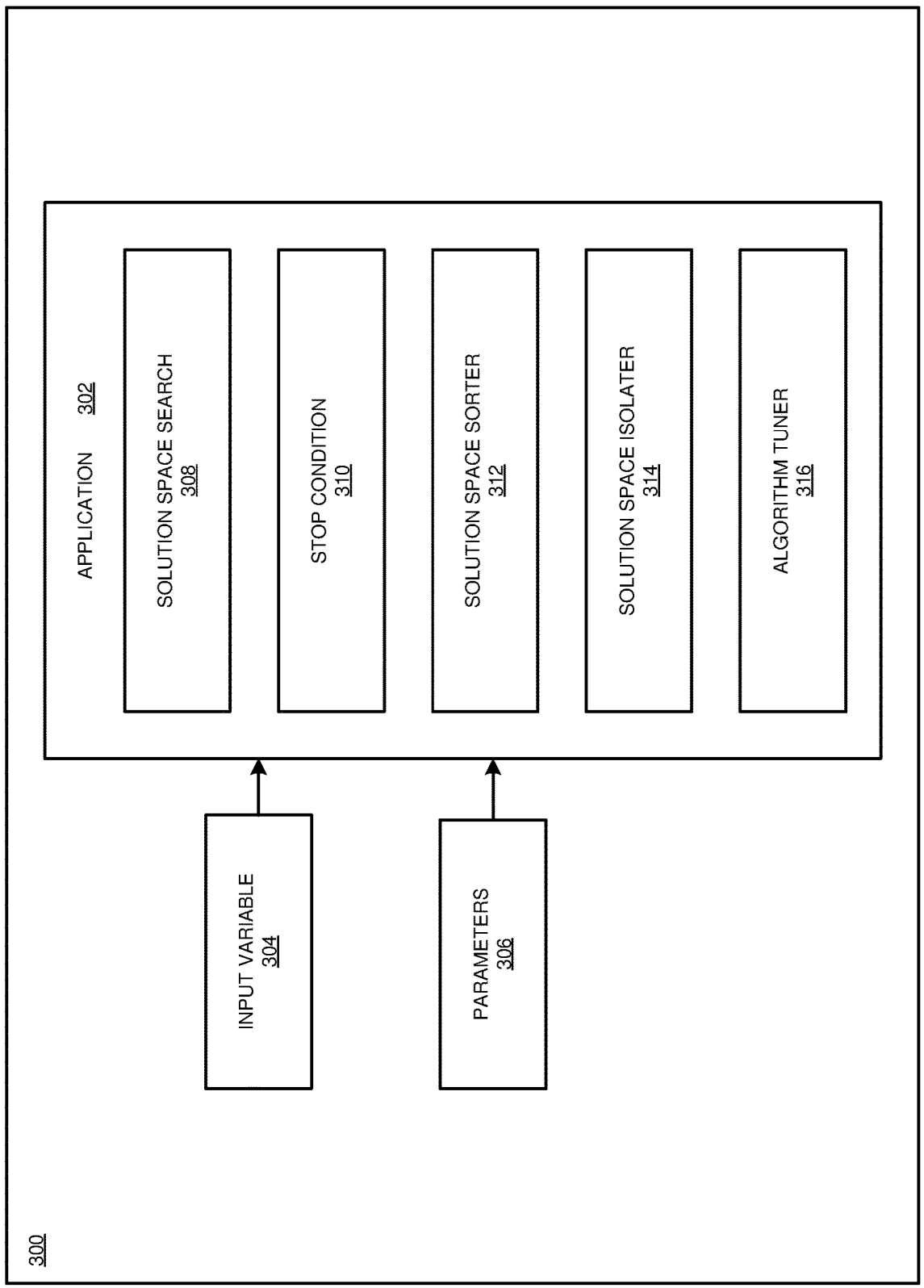
FIG. 3 depicts a block diagram of an example configuration for enhancing a quantum-classical hybrid variational algorithm in accordance with an illustrative embodiment.

With reference to FIG. 3, this figure depicts a block diagram of an example configuration 300 for enhancing a quantum-classical hybrid variational algorithm for quantum computing. The example embodiment includes an application 302. In a particular embodiment, application 302 is an example of application 105 of FIG. 1.

Application 302 receives an input variable 304 and parameters 306. Input variable 304 determines the portion of potential solutions selected from the iterations of the variational algorithm. For example, the input variable 304 can be a threshold value, such as, a percentage of the potential solutions. Parameters 306 represent a wavefunction corresponding to a quantum state of the quantum system.

In some embodiments, the user inputs a set of variables. For example, the user can input an initial threshold value and a final threshold value. A first iteration of the variational algorithm uses the initial threshold value. Application 302 varies the threshold value for subsequent iterations until the final threshold value is reached. For example, application 302 linearly varies the threshold value from the initial threshold value for the first iteration to the final threshold value for the final iteration.

Application 302 includes a solution space search component 308, a stop condition component 310, a solution space sorter component 312, a solution space isolator component 314, and an algorithm tuner component 316. In the embodiment, solution space search component 308 executes, on a quantum processor, a variational algorithm to produce a subset of a set of solutions (solution space). For example, a quantum processor can perform several iterations of a variational algorithm to compute a subset of solutions, each solution in the subset corresponding to a value from one iteration of the variational algorithm.

In an embodiment, stop condition component 310 monitors and controls the number of iterations performed by the quantum processor. For example, the stop condition component 310 may receive an input from the user to perform fifty iterations of the variational algorithm. In some embodiments, the stop condition is a predefined period to execute the variational algorithm. In some embodiments, the stop condition occurs when the final threshold value is reached.

In an embodiment, solution space sorter component 312 arranges and orders the subset of solutions according to a sorting criterion. For example, the solution space sorter component 312 can arrange the subset of solutions in ascending order. In an embodiment, the solution space isolator component 314 selects a portion of the subset of solutions. Each solution in the portion is within a boundary defined by a threshold value. For example, if the input variable is five percent, the solution space isolator component 314 can isolate a portion of the subset of solutions corresponding to five percent of the total number of solutions in the subset of solutions.

In some embodiments, the solution space isolator component 314 computes an average solution from the portion forming one extreme of the solution space. The average solution corresponds to a conditional value at risk for the combinatorial optimization problem. For example, solution space isolator component 314 can compute an average solution from the portion of the subset of solutions at a minimum end of the solution space. In an embodiment, algorithm tuner component 316 alters the variational algorithm to produce a second subset of solutions. For example, algorithm tuner component 316 can alter the variational algorithm to produce a second subset of solutions such that the second subset of solutions comprises solutions having values within the boundary.

Figure 4:
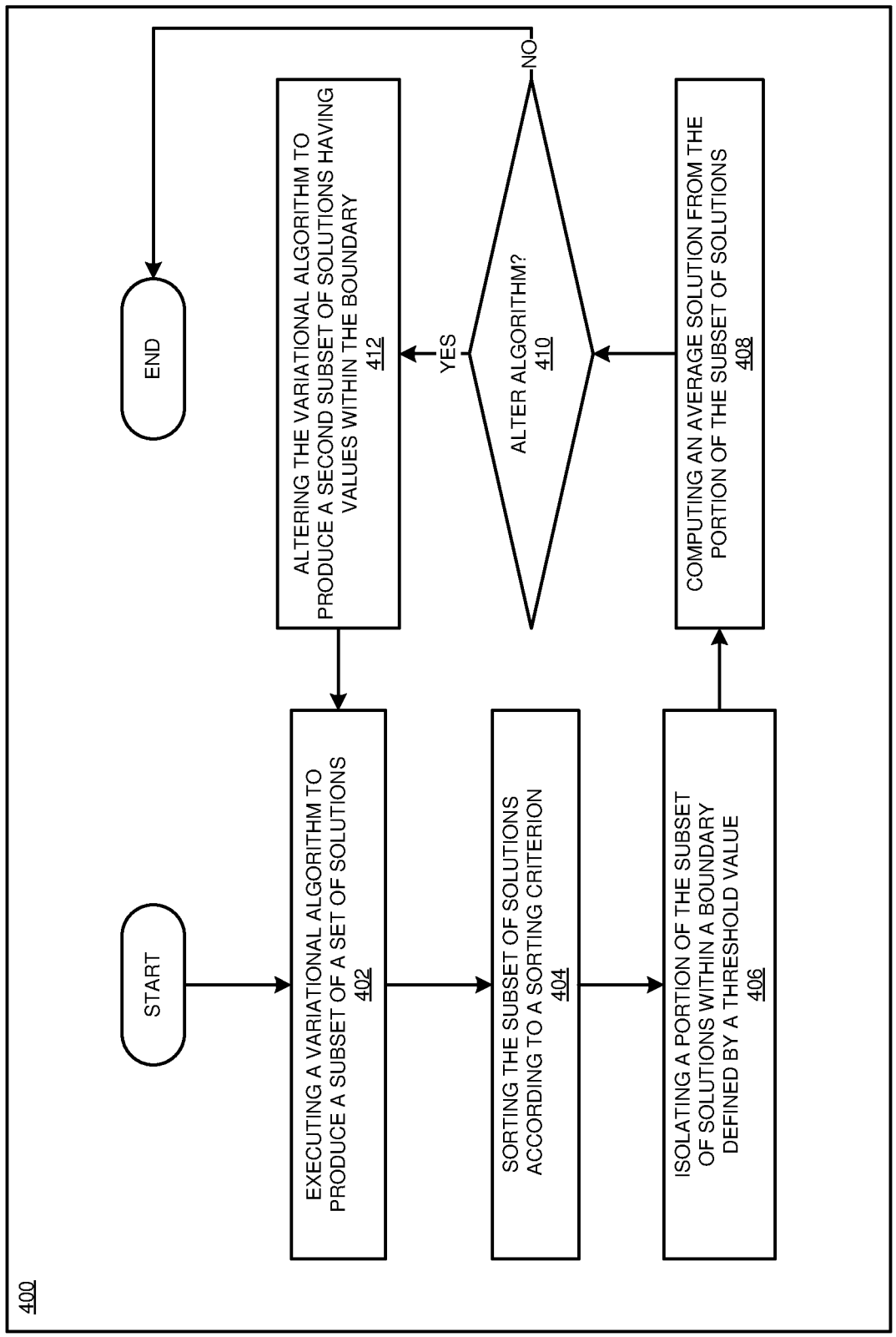
FIG. 4 depicts a flowchart of an example method for enhancing a quantum-classical hybrid variational algorithm in accordance with an illustrative embodiment.

With reference to FIG. 4, this figure depicts a flowchart of an example method 400 for operating a data processing system for enhancing quantum-classical algorithms for combinatorial optimization in accordance with an illustrative embodiment. In block 402, application 302 executes, on a quantum processor, a variational algorithm. Executing the variational algorithm produces a subset of a set of solutions (solution space) of the variational algorithm within a predefined period. The variational algorithm implements a combinatorial optimization problem. Each solution in the subset has a corresponding value. For example, the variational algorithm may compute an expectation value of the Hamiltonian operator of a molecule with a given interatomic spacing as a solution for each iteration. In an embodiment, each of the set of expectation values corresponds to an expectation value of the Hamiltonian operator as a solution of each iteration.

In block 404, application 302 sorts the subset of solutions according to a sorting criterion. For example, application 302 may arrange the set of values in ascending order. In block 406, application 302 isolates a portion of the subset of solutions. A value corresponding to each solution in the portion is within a boundary defined by a threshold value. For example, application 302 can select a portion of the subset of expectation values representing a first a percent of the arranged set of values, wherein a is the input variable. Application 302 selects a portion of the subset of solutions based on the sorted arrangement. For example, application 302 can select a portion of the subset of solutions corresponding to the first n values in the ordered arrangement.

In block 408, the application 302 computes an average solution from the portion of the subset of solutions. The average solution from the portion forms one extreme of the solution space. For example, application 302 calculates an average of a portion of the subset of solutions corresponding to the lowest five percent of the subset of solutions. In block 410, application 302 determines whether the variational algorithm needs to be altered. Application 302 performs an analysis of the variational algorithm based on the computed average solution and the produced subset of the set of solutions.

If application 302 determines the variational algorithm requires tuning ("Yes" path of block 410), the application 302 prompts the user to alter an aspect of the variational algorithm. In some embodiments, application 302 alters the variational algorithm to produce a second subset of solutions such that the second subset of solutions comprises solutions having values within the boundary. For example, executing, on a quantum processor, the altered variational algorithm, produces a second subset of solutions such that the second subset of solutions comprises solutions having values within the boundary. In an embodiment, application 302 returns to block 402 to perform the method 400 again with the altered variational algorithm. If application 302 determines the variational algorithm does not require tuning ("No" path of block 410), method 400 then ends.

With reference to FIG. 5, this figure depicts an example graph 500 of an isolation step for enhancing a quantum-classical hybrid variational algorithm in accordance with an illustrative embodiment. Line 502 represents a selection of five percent of the set of values computed using the variational algorithm. Five percent of the computed set of values are below line 502 in the graph. Line 504 represents an average value of the computed set of values. Line 504 represents determining an average from the entire set of computed values.

Various embodiments of the present invention are described herein with reference to the related drawings. Alternative embodiments can be devised without departing from the scope of this invention. For example, additional variational algorithms for quantum computing may be included in of method 400 without departing from the scope of the present invention.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one"

and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
    executing, on a quantum processor, a variational algorithm, the execution producing a subset of a set of solutions (solution space) of the variational algorithm within a predefined period, the variational algorithm computing a quantum state of a quantum system corresponding to a combinatorial optimization problem, each solution in the subset having a corresponding value;
    sorting, according to a sorting criterion, the subset of solutions;
    isolating, based on the sorting, a portion of the subset of solutions wherein a value corresponding to each solution in the portion is within a boundary defined by a threshold value;
    computing an average value of the solutions from the portion of the subset of solutions; and
    altering the variational algorithm to produce a second subset of solutions such that the second subset of solutions comprises solutions having values within the boundary.

2. The method of claim 1, sorting the subset of solutions comprising:
    arranging the subset of solutions in ascending order according to the sorting criterion.

3. The method of claim 1, wherein the portion of the subset of solutions corresponds to the lowest five percent of the subset of solutions.

4. The method of claim 1, further comprising executing, on the quantum processor, the altered variational algorithm, the executing producing the second subset of solutions of the altered variational algorithm within a second predefined period, each solution in the second subset having a corresponding value.

5. The method of claim 1, further comprising:
    receiving, prior to isolating the portion of the subset of solutions, an input variable corresponding to the threshold value.

6. The method of claim 5, wherein the input variable is a percentage value.

7. The method of claim 1, further comprising:
    receiving, prior to isolating the portion of the subset of solutions, a first input variable corresponding to the threshold value and a second input variable corresponding to a second threshold level; and
    executing, on the quantum processor, a set of iterations of the variational algorithm, the execution producing a subset of a set of solutions (solution space) of the variational algorithm for each iteration of the variational algorithm, each iteration of the variational algorithm computing a quantum state of a quantum system corresponding to a combinatorial optimization problem, each solution in each subset having a corresponding value;
    sorting, according to the sorting criterion, a second subset of solutions and a third subset of solutions;
    isolating, based on the sorting, a second portion of a second subset of solutions wherein a value corresponding to each solution in the second portion is within the boundary defined by the threshold value;
    computing an average value of the solutions from the portion of the second subset of solutions; and
    isolating, based on the sorting, a third portion of a third subset of solutions wherein a value corresponding to each solution in the third portion is within a second boundary defined by the second threshold value.

8. The method of claim 1, executing the variational algorithm further comprising:
    computing an expectation value of the quantum state of the quantum system, wherein the quantum state of the quantum system corresponds to a set of quantum logic gates on the quantum processor.

9. The method of claim 1, wherein the average value of the solutions forms one extreme of the solution space.

10. A computer usable program product comprising a computer-readable storage device, and program instructions stored on the storage device, the stored program instructions comprising:
    program instructions to execute, on a quantum processor, a variational algorithm, the execution producing a subset of a set of solutions (solution space) of the variational algorithm within a predefined period, the variational algorithm computing a quantum state of a quantum system corresponding to a combinatorial optimization problem, each solution in the subset having a corresponding value;
    program instructions to sort, according to a sorting criterion, the subset of solutions;
    program instructions to isolate, based on the sorting, a portion of the subset of solutions wherein a value corresponding to each solution in the portion is within a boundary defined by a threshold value;
    program instructions to compute an average value of the solutions from the portion of the subset of solutions; and
    program instructions to alter the variational algorithm to produce a second subset of solutions such that the second subset of solutions comprises solutions having values within the boundary.

11. The computer usable program product of claim 10, wherein the computer usable code is stored in a computer readable storage device in a data processing system, and wherein the computer usable code is transferred over a network from a remote data processing system.

12. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

13. The computer usable program product of claim 10, the program instructions to sort the subset of solutions comprising:
program instructions to arrange the subset of solutions in ascending order according to the sorting criterion.

14. The computer usable program product of claim 10, wherein the portion of the subset of solutions corresponds to the lowest five percent of the subset of solutions.

15. The computer usable program product of claim 10, the stored program instructions further comprising:
program instructions to execute, on the quantum processor, the altered variational algorithm, the executing producing the second subset of solutions of the altered variational algorithm within a second predefined period, each solution in the second subset having a corresponding value.

16. The computer usable program product of claim 10, the stored program instructions further comprising:
program instructions to receive, prior to isolating the portion of the subset of solutions, an input variable corresponding to the threshold value.

17. The computer usable program product of claim 10, wherein the input variable is a percentage value.

18. The computer usable program product of claim 10, the stored program instructions further comprising:
program instructions to receive, prior to isolating the portion of the subset of solutions, a first input variable corresponding to the threshold value and a second input variable corresponding to a second threshold level; and
program instructions to execute, on the quantum processor, a set of iterations of the variational algorithm, the execution producing a subset of a set of solutions (solution space) of the variational algorithm for each iteration of the variational algorithm, each iteration of the variational algorithm computing a quantum state of a quantum system corresponding to a combinatorial optimization problem, each solution in each subset having a corresponding value;
program instructions to sort, according to the sorting criterion, a second subset of solutions and a third subset of solutions;
program instructions to isolate, based on the sorting, a second portion of the second subset of solutions, wherein a value corresponding to each solution in the second portion is within the boundary defined by the threshold value; and
program instructions to isolate, based on the sorting, a third portion of the third subset of solutions, wherein a value corresponding to each solution in the third portion is within a second boundary defined by the second threshold value.

19. The computer usable program product of claim 10, program instructions to execute the variational algorithm further comprising:
program instructions to compute an expectation value of the quantum state of the quantum system, wherein the quantum state of the quantum system corresponds to a set of quantum logic gates on the quantum processor.

20. A computer system comprising a processor, a computer-readable memory, and a computer-readable storage device, and program instructions stored on the storage device for execution by the processor via the memory, the stored program instructions comprising:
program instructions to execute, on a quantum processor, a variational algorithm, the execution producing a subset of a set of solutions (solution space) of the variational algorithm within a predefined period, the variational algorithm computing a quantum state of a quantum system corresponding to a combinatorial optimization problem, each solution in the subset having a corresponding value;
program instructions to sort, according to a sorting criterion, the subset of solutions;
program instructions to isolate, based on the sorting, a portion of the subset of solutions wherein a value corresponding to each solution in the portion is within a boundary defined by a threshold value;
program instructions to compute an average value of the solutions from the portion of the subset of solutions; and
program instructions to alter the variational algorithm to produce a second subset of solutions such that the second subset of solutions comprises solutions having values within the boundary.

* * * * *